US009847846B2

(12) United States Patent
Gibbons et al.

(10) Patent No.: US 9,847,846 B2
(45) Date of Patent: Dec. 19, 2017

(54) CONTENT DELIVERY SYSTEM

(75) Inventors: John Gibbons, London (GB); Robert Ming Lee, London (GB); Graeme Peter Wilson, London (GB); Finlay James Fraser, London (GB); Sanjay Rugnath Vadgama, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 316 days.

(21) Appl. No.: 14/117,248

(22) PCT Filed: Apr. 27, 2012

(86) PCT No.: PCT/GB2012/000393
§ 371 (c)(1),
(2), (4) Date: Nov. 12, 2013

(87) PCT Pub. No.: WO2012/153081
PCT Pub. Date: Nov. 15, 2012

(65) Prior Publication Data
US 2015/0131649 A1    May 14, 2015

(30) Foreign Application Priority Data
May 9, 2011   (EP) .................................... 11250511

(51) Int. Cl.
*H04N 21/43*      (2011.01)
*H04J 3/06*       (2006.01)
(Continued)

(52) U.S. Cl.
CPC .......... *H04J 3/0658* (2013.01); *H04J 3/0632* (2013.01); *H04L 47/30* (2013.01); *H04M 7/006* (2013.01)

(58) Field of Classification Search
None
See application file for complete search history.

(56) References Cited

U.S. PATENT DOCUMENTS

| 4,991,032 A * | 2/1991 | Staffer ................. G04G 15/006 386/207 |
| 5,087,980 A * | 2/1992 | Staffer ................. G04G 15/006 386/205 |

(Continued)

FOREIGN PATENT DOCUMENTS

| WO | WO 2006/110960 | 10/2006 |
| WO | WO 2011/000041 | 1/2011 |

OTHER PUBLICATIONS

International Search Report for PCT/GB2012/000393, dated Jun. 13, 2012.
(Continued)

*Primary Examiner* — Fan Ng
(74) *Attorney, Agent, or Firm* — Nixon & Vanderhye P.C.

(57) ABSTRACT

The audio outputs 29 of each of a plurality of telecommunications terminals in a packet switched system are synchronized by having each terminal transmit a stream of packets whose rate, and therefore duration is determined according to a clock generator 25, and is thus indicative of the rate at which the terminal is generating its audio output. The signals from each terminal are transmitted to a common server. For each terminal, the server uses a master dock to compare the duration of the packet stream with an expected duration, and calculates an offset value which is returned to the respective terminal. Each terminal stores the offset value it receives (20) and uses it to adjust the output of its clock generator 25 so that its operations can be synchronized to the server. This allows all the terminals' digital-to-analog conversion processes to be synchronized such that all their analog outputs are coordinated, allowing co-located acoustic outputs to be (Continued)

synchronous. A second embodiment maintains synchronization by maintaining the volume of the data buffer 23 serving the audio output 29 within predetermined limits.

16 Claims, 5 Drawing Sheets

(51) Int. Cl.
*H04L 12/835* (2013.01)
*H04M 7/00* (2006.01)

(56) References Cited

U.S. PATENT DOCUMENTS

| | | | |
|---|---|---|---|
| 6,005,872 A * | 12/1999 | Bassi et al. | 370/477 |
| 7,041,892 B2 * | 5/2006 | Becker | G10H 1/0091 84/603 |
| 7,613,212 B1 * | 11/2009 | Raz et al. | 370/510 |
| 9,053,146 B1 * | 6/2015 | Kapoor | G06F 17/30386 |
| 2001/0043621 A1 * | 11/2001 | Anderson et al. | 370/516 |
| 2001/0046241 A1 * | 11/2001 | Shimosakoda | 370/509 |
| 2002/0061012 A1 * | 5/2002 | Thi | H04B 3/23 370/352 |
| 2003/0212997 A1 * | 11/2003 | Hejna, Jr. | H04N 21/47217 725/88 |
| 2005/0041537 A1 * | 2/2005 | Tanaka | G11B 11/10595 369/13.05 |
| 2006/0013263 A1 * | 1/2006 | Fellman | 370/503 |
| 2006/0072695 A1 | 4/2006 | Iwamura | |
| 2007/0038999 A1 * | 2/2007 | Millington | H04J 3/0664 718/100 |
| 2007/0140398 A1 * | 6/2007 | Inoue et al. | 375/372 |
| 2007/0229910 A1 * | 10/2007 | Ulybin | H04L 29/06027 358/405 |
| 2008/0019398 A1 * | 1/2008 | Genossar et al. | 370/498 |
| 2008/0181260 A1 * | 7/2008 | Vonog et al. | 370/519 |
| 2009/0257458 A1 * | 10/2009 | Cui | H04J 3/0632 370/503 |
| 2011/0273213 A1 * | 11/2011 | Rama | H04W 52/029 327/291 |

OTHER PUBLICATIONS

Communication pursuant to Article 94(3) EPC dated Aug. 18, 2015 issued in corresponding European Application No. 12716516.5 (5 pgs.).

Response to Communication pursuant to Article 94(3) dated Aug. 18, 2015 in corresponding European Application No. 12716516.5 (19 pgs.).

* cited by examiner

CONTENT DELIVERY SYSTEM

This application is the U.S. national phase of International Application No. PCT/GB2012/000393, filed 27 Apr. 2012, which designated the U.S. and claims priority to EP Application No. 11250511.0, filed 9 May 2011, the entire contents of each of which are hereby incorporated by reference.

BACKGROUND AND SUMMARY

This invention relates to telecommunications devices, and in particular to synchronisation of outputs to multiple audio terminals.

In systems designed for use in the financial services industry it is common practice to provide a telecommunications terminal or "turret" for each user, which includes a loudspeaker output. The users, in addition to calls on handset, may listen to a number of conversations on handsfree speakers, with the ability to talkback to any one or more speaker conversations.

If several terminals on the same trading floor are connected to the same audio channel, multiple outputs of that channel will be audible. In a conventional trading system, using standard Time Domain Multiplexed (TDM) Telephony, an accurate frequency is available from the incoming TDM clock and all terminals have their audio play-out synchronised to this common clock source. Consequently any lag between the outputs will be relatively small and, more importantly, constant, and will be perceived as an echo.

However, in modern packet-switched telephony systems, the individual terminals have no such common frequency reference. Their speakers, handsets and video are driven by Real-time Transport Protocol (RTP) Internet packet streams from diverse sources. In such systems, audio from a common source is transmitted through an asynchronous network to multiple termination points. As they are asynchronous, they each have an autonomous clock frequency. Because of their unsynchronised clock frequencies, the individual terminals therefore do not output the audio signal at the same rate. Consequently, the delay between different outputs will not be constant, and, in particular, the playout from each terminal will be controlled according to its own internal clock. This will cause playouts from different terminals to run at different rates, causing an echo effect with a variable delay. Such a variable delay is perceptually distracting as such a phenomenon does not occur in a normal acoustic environment.

The terminal audio play-out buffers would have different depths during a call, which would cause a differential audio delay. When the terminals are all playing the same audio, with different delays on their speakers, this can give a disturbing 'stadium' echo effect.

It is therefore desirable to synchronise the outputs.

Prior art approaches, such as that described in WO05/002100 (Philips), WO2006/110960 (NAT ICT), US20091298420 (Haartsen), US2008/259966 (Baird), and WO2011/000041 (Avega) use a regular time stamp to ensure absolute synchronicity, which is not a practical approach in a packet system where there are significant and variable delays in the transmission of signals, including the timestamp itself, to the terminals. They also require a significant signalling overhead.

However, absolute synchronicity is not required in the present context the acoustic path differences between the various individual audio outputs and the various human listeners make this impossible to achieve in any case. It is nevertheless desirable that the various outputs all run at the same speed in other words to arrange that any delay that does exist between one audio output and another is constant, but not necessarily zero. The present invention provides a convenient way of achieving this without requiring a major signalling overhead According to the invention, there is provided a method of controlling a telecommunications terminal in a packet switched system, wherein the terminal transmits to a server a rate-indication signal indicative of the rate at which it generates an audio output, the server determines an offset value by comparison of the rate-indication signal received from the terminal with a rate set by the server, the server transmits the offset value to the terminal, and the terminal applies the offset value to its audio output so that the rate at which the output is generated becomes synchronised to the rate set by the server.

In one embodiment, the terminal has an internal clock having a predetermined clocking value, and the method comprises the steps of:

generating, at the terminal, a stream of packets of a duration determined according to the clocking value;

transmitting the stream of packets over the packet switched system to a server having a master clock;

at the server, determining the duration of the stream of packets according to the master clock; calculating an offset value indicative of the difference between the duration of the stream determined by the terminal clock and the duration as determined by the master clock;

transmitting the offset value to the terminal;

adjusting the clocking value of the terminal by applying the offset value received from the server;

operating packet handling functions of the terminal according to the adjusted clocking value.

In an alternative embodiment, the terminal having an internal clock having a predetermined clocking value, and a data buffer, and the method comprises the steps of:

generating, at the terminal, a signal indicative of the buffer depth, transmitting the buffer depth signal to the server;

at the server, calculating an offset value indicative of the difference between the actual buffer depth and an optimum buffer depth determined by the server;

transmitting the offset value to the terminal;

adjusting the clocking value of the terminal by the offset value;

operating packet handling functions of the terminal according to the adjusted clocking value.

The invention also extends to a telecommunications terminal for connection to a packet switched system, the terminal comprising an internal clock having a predetermined clocking value a signal generator for generating a rate-indication signal indicative of the rate at which the terminal generates an audio output, a transmitter for transmitting the rate-indication signal to a server a receiver for receiving an offset value from the server;

and a clock adjustment processor for adjusting the clocking value of the terminal according to the offset value.

The invention also provides a complementary server for connection to a packet switched telecommunications system for controlling one or more telecommunications terminals connected to the system, the server comprising:

a master clock;

a receiver for receiving a rate-indication signal from each terminal indicative of the rate at which each respective terminal generates an audio output, a processor for calculating, for each terminal, a respective offset value derived from the rate-indication signal received from the terminal, and a transmitter for transmitting the offset values to the respective terminals.

The server may comprise a program store for storing program data for configuring one or more of the terminals to operate according to the invention, being configured to identify one or more terminals to be synchronised, and to transmit the program data to the terminals so identified, together with address data specific to the server such that the terminals can transmit packet streams to the server.

Preferably the process of the invention is repeated at intervals to maintain the clocking value within a predetermined limit from the master clock value. These intervals may be selected according to the amount of drift in clocking value determined in previous iterations, thereby reducing signalling overhead when the value is stable.

The invention is intended for use in applications wherein the packet handling functions controlled by the internal clocks of the terminals include the generation of an audio signal from a packet stream. This allows the rate at which audio signals are generated by the terminals to be synchronised to the master clock and therefore with each other.

Thus individual client terminals can transmit sample outputs to a clocking server having a centralised clock source, and the server determines, from the output from each terminal, an offset value which it returns to the respective terminal, such that the terminal may apply the offset value so that its output rate becomes synchronised to the centralised clock source.

BRIEF DESCRIPTION OF THE DRAWINGS

An embodiment of the invention will now be described by way of example with reference to the drawings, in which.

DETAILED DESCRIPTION OF PRESENT EXAMPLE EMBODIMENTS

Figure 1:
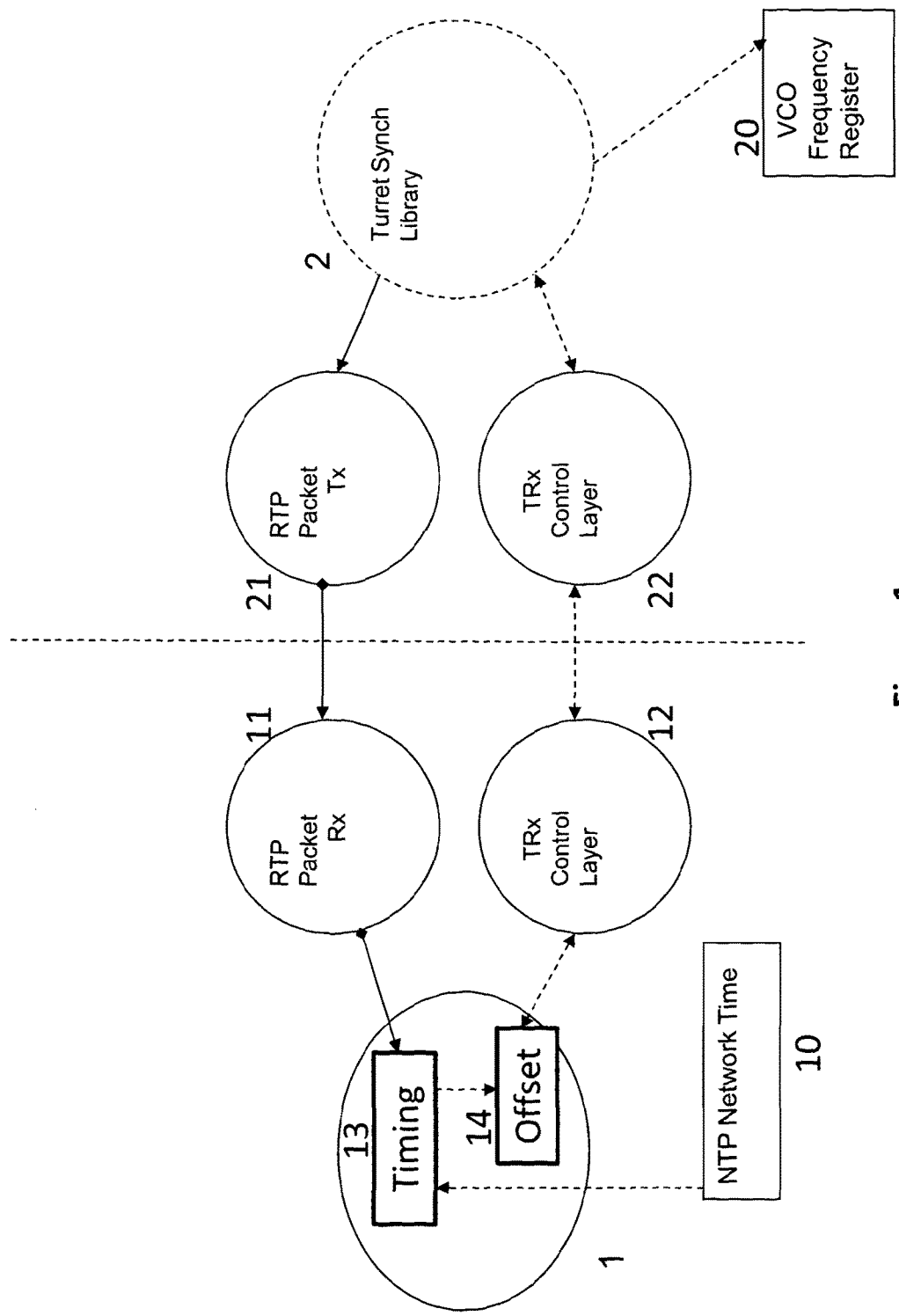
FIG. 1 is a schematic depiction of the components which co-operate in the performance of the invention

FIG. 1 depicts a synchronisation server 1 and a user terminal 2 ("turret") in the network. For the purpose of illustration, only one such terminal is shown, but it will be understood that each of several such terminals will co-operate with the synchronisation server 1.

In this embodiment the invention is implemented in two software components: a Synchronisation Controller implemented on the server 1 and a Turret Synchronisation Library residing on each user terminal ("turret") 2.

The Synchronisation Controller 1 monitors the frequency of the terminal packet stream and adjusts the frequency of the terminal TDM clock to phase-lock the packet stream to an NTP Time reference.

The synchronisation server 1 has an input from a master clock 10, and an interface with the network 3 comprising a receiver 11 for receiving packet streams from individual terminals (e.g. 2) and a signalling transceiver 12 for exchanging data with the terminals. This embodiment uses NTP time protocol as the central server's reference clock. The transceiver includes an appropriate addressing processor to direct commands to the appropriate user terminals. The controller also includes a timer 13 to determine the actual duration, according to the master clock 10, of a set of packets received by the receiver 11, and an offset calculator 14 for determining the difference between the measured value and a standard value.

Figure 2:
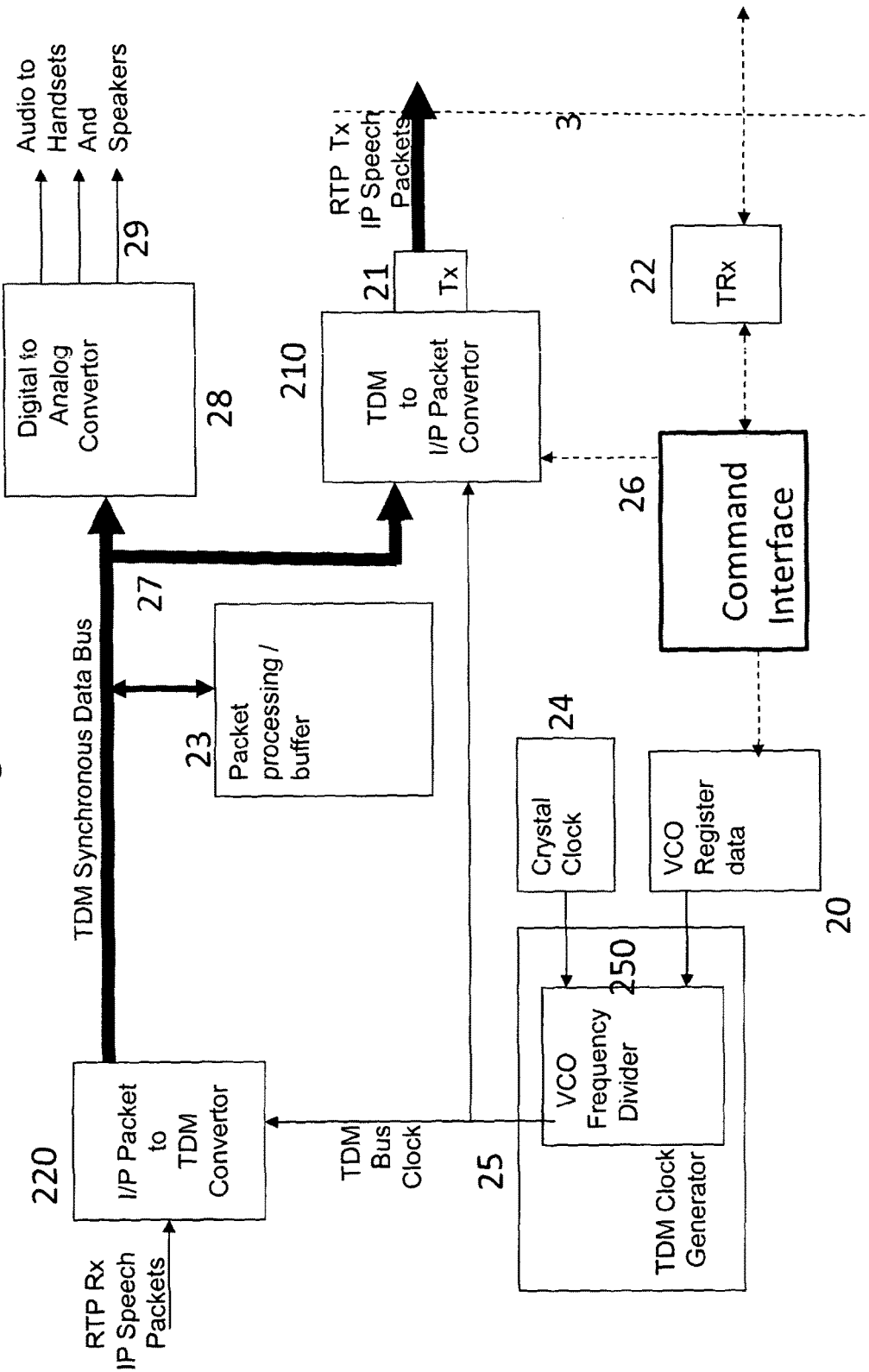
FIG. 2 is a schematic depiction of the functional elements of the user terminal of a first embodiment in more detail

FIG. 2 depicts those functional elements of the user terminal 2 concerned with control of the terminal's output. The user terminal has an internal clock 24 which provides a reference signal for a clock generator 25 which is used to synchronise the functions of the terminal 25. This includes control of a converter 220 for converting incoming packets of RTP data received from an external source into TDM mode, for transmission over a databus 27. A packet processor 23 converts and buffers the packet data for delivery via the data bus 27 to a digital-to-analog convertor 28 for output as an audio signal 29.

In addition to its conventional functions as a communications terminal, the terminal has a signalling transceiver 22 for exchanging control data with the synchronisation server, and a packet transmitter 21 for transmitting packet streams to the synchronisation server 1. The transmitter 21 is associated with a respective convertor 210 to convert data between TDM and packet switched format. The terminal also has a frequency control system 20 for controlling the operation of its streaming functions. Both the transmitter 21 and transceiver 22 are connected to the network through a common Ethernet port.

In the present invention, the command interface 26 causes the packet generator 210 to generate RTP packets for transmission to the synchronisation server 1, in response to a command received by the transceiver 22 from the server 1. The packet generator 210 generates these packets under the control of the clocking signal received from the clock generator 25, in the same way as the audio output 29. The command interface 26 on the terminal allows these synchronisation functions to be exercised remotely by the Synchronisation Controller 1.

The RTP synchronisation packets sent to the central server do not carry any voice data—i.e the audio path is not connected to the handset or speaker of the terminal.

The clock generator 25 generates clocking signals which are controlled by the internal clock 24 and an offset signal generated by reference to the frequency control system 20, the two inputs being combined in a frequency divider 250. The frequency control system 20 stores an offset value generated by, and transmitted from, the synchronisation server 1 in response to the speech packets transmitted to it by the packet transmitter 21, which it compares with its own master clock reference 10.

Figure 3:
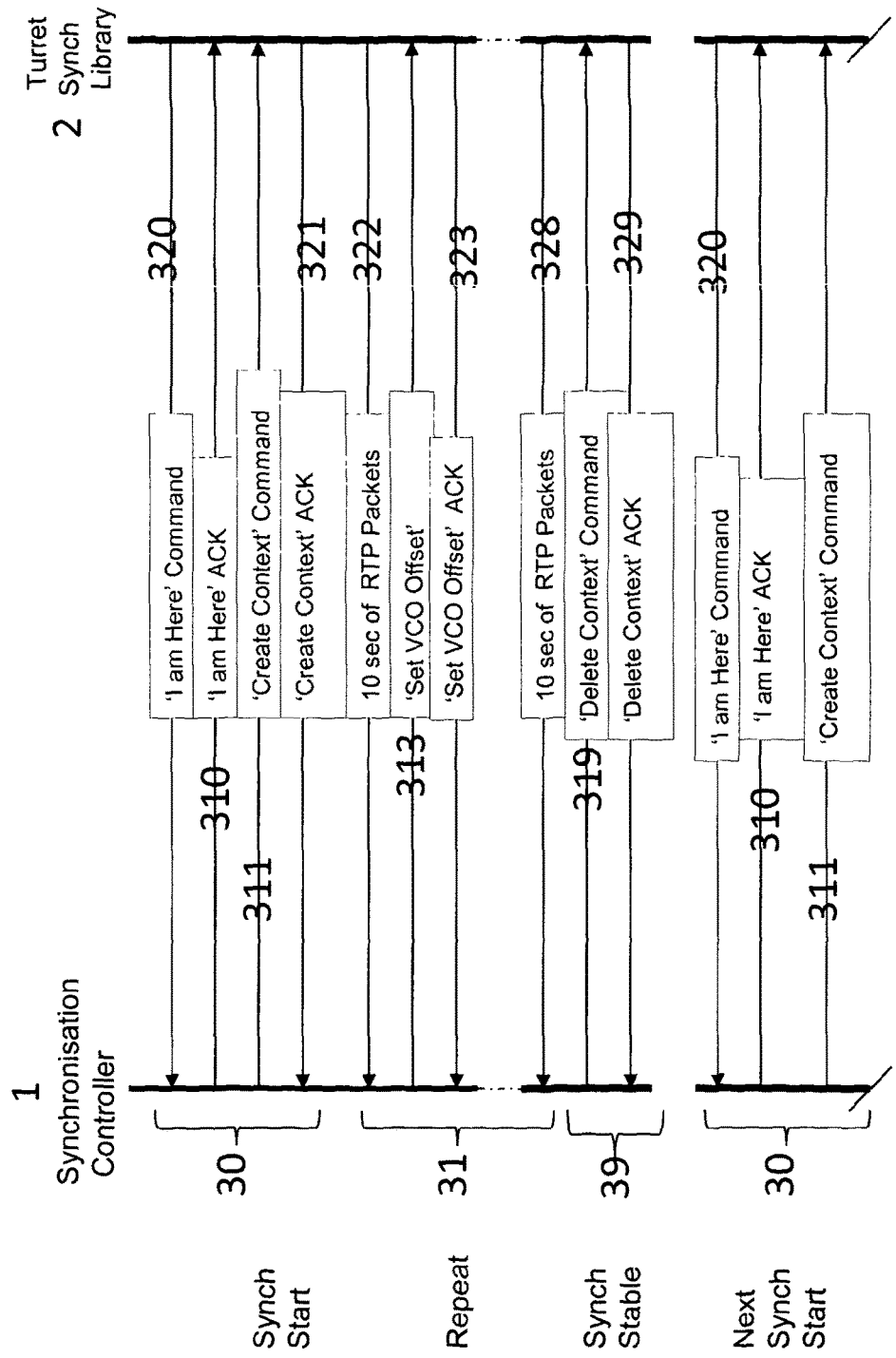
FIG. 3 is a sequence diagram illustrating the exchange of signals between the synchronisation server and the user terminal in the first embodiment.

FIG. 3 is a sequence diagram illustrating the exchange of signals between the synchronisation server 1 and the user terminal ("turret") 2. The process has three main phases: start up (30), synchronisation acquisition (31), and synchronisation achieved (39). The acquisition process (31) is iterative, being repeated as many times as necessary to achieve stability.

In this embodiment, synchronisation of the RTP (real-time transport protocol) IP (internet protocol) voice play-outs of the various terminals 2 ("turrets") is effected by a remote Synchronisation Server 1, acting through the command interface 26. The Turret Synchronisation Library sets up a packet stream 322. The packet convertor 21 transmits this set of packets 322, typically a stream of ten seconds duration, from its current output buffer, over the link to the server 1.

The processing algorithm runs on the server, and the terminals send "I am here" messages to the server and then set up and tear down the packet streams when instructed and apply the VCO offsets sent by the Synchronisation Server. On power up of the terminal 2 a start value of its VCO offset is read from an internal file 20. This file can be re-written by the Synchronisation Controller sending a 'Set Start-up VCO Offset' Command.'

The synchronisation process is initiated by the terminal 2, which transmits an "I am here" alert 320 when it is first connected to the server 1, and subsequently at infrequent intervals. The alert 320 includes the current VCO register value for the originating terminal 2. This alert initiates the synchronisation process 31.

The command interface 26 is also configured to respond to Create/Destroy RTP Context Messages, by translating these messages into calls to a Device Driver to generate, or cease to generate, the appropriate data streams and to translate 'Set Start-up VCO Offset' command, into a re-write of the VCO Start-up Offset value stored in the register data 20

On receiving an 'I am Here' Command, the Synchronisation Controller 1 transmits an acknowledgement (310). It also retrieves the VCO register value from the alert 320 and starts an RTP transmit stream from the terminal by issuing the terminal with a 'Create Context' Command 321 using the Command RX/Tx Module 26.

The data stream can be any suitable set of data representative of the data to be output by the terminal 2. A 'Create Context" Command 311 is sent from the Synchronisation Controller, which includes the IP address of the Synchronisation Controller 1.

The terminal 2 sends RTP packets 322 at regular intervals to the Controller 1. in one embodiment each terminal is instructed to stream packets 322 at a rate derived from its playout clock frequency 24. The common reference is the NTP time protocol providing the reference clock for the central server 1, from which the server derives an offset signal 313 for each terminal. This signal is received by the terminal 2 which is configured through the command interface 26 to adjust the frequency of the voltage controlled oscillator 250 in response to the input 313 received from the server, so as to cause adjustments to be made to maintain packet arrival at the server 1 in precise phase with time elapsed since the first packet was received from the terminal.

The server 1 implements a high priority packet-receiving process which waits on a blocking socket to receive RTP Packets. After a predetermined number of packets the process writes the arrival time into the processing queue for each active RTP context, for processing by the lower priority Synchronisation Control loop. The number of packets may be configurable.

The Synchronisation Controller can therefore monitor the frequency of the terminal packet stream. It can then adjust the frequency of the terminal TDM clock to phase-lock the packet stream, by generating an offset value 313. This offset value 313 is the value by which the time as determined by the terminal's internal clock 24 is to be adjusted to achieve synchronisation with the server 1. This value is added to the terminal's current nominal VCO value, and loaded into the VCO Frequency Register 20 when a Set VCO Offset Command is received, thereby adjusting the offset to compensate for any drift from the value previously stored therein.

The terminal acknowledges (323) the offset signal and stores the offset value 313 for use by its frequency control system 20.

This process 322, 313, 323 is repeated, the terminal each time using a clocking frequency as determined by its clock generator 25 in accordance with the inputs from its internal clock 24 and the offset currently stored on the frequency control system 20.

This process can calibrate the terminals 2 to a relative accuracy of less than one part in ten million. This keeps each terminal audio stream in synchronisation with that of other terminals.

Once stable synchronisation is achieved; the process terminates (step 39). This is triggered when the server 1 assesses the most recent set of RTP packets 328 that it has received as meeting specified stability criteria. Such criteria would be that a predetermined number of previous cycles have required no adjustment to the offset value. In response to this, the server 1 transmits a "delete context" command 319 which is acknowledged (329) by the terminal.

After this control loop has stabilised, the Controller issues a Destroy Context command 319 to the terminal and waits for further 'I am Here' commands 320 from the terminals.

Figure 4:
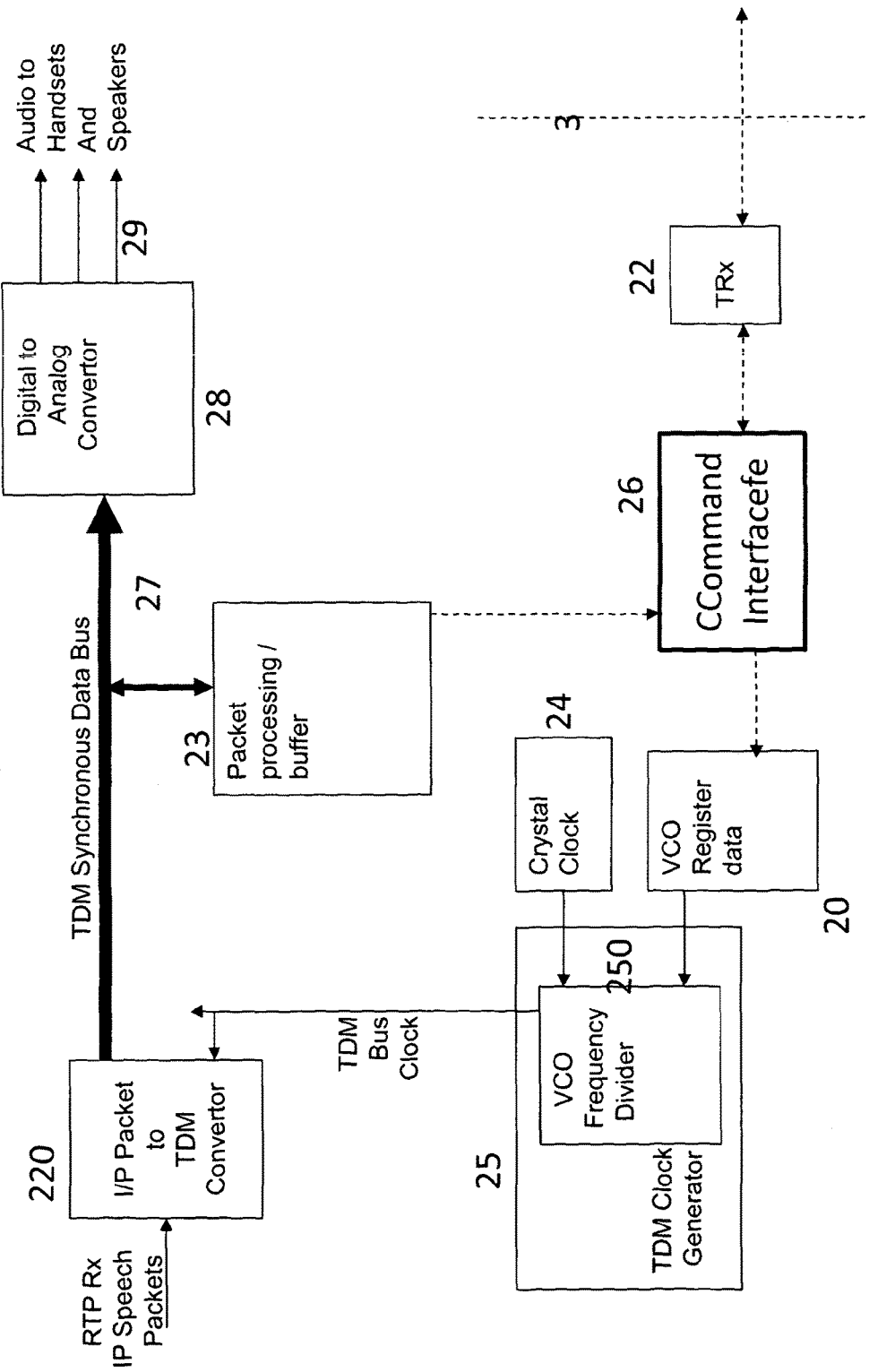
FIG. 4 is a schematic depiction of the functional elements of a second embodiment of the user terminal
Figure 5:
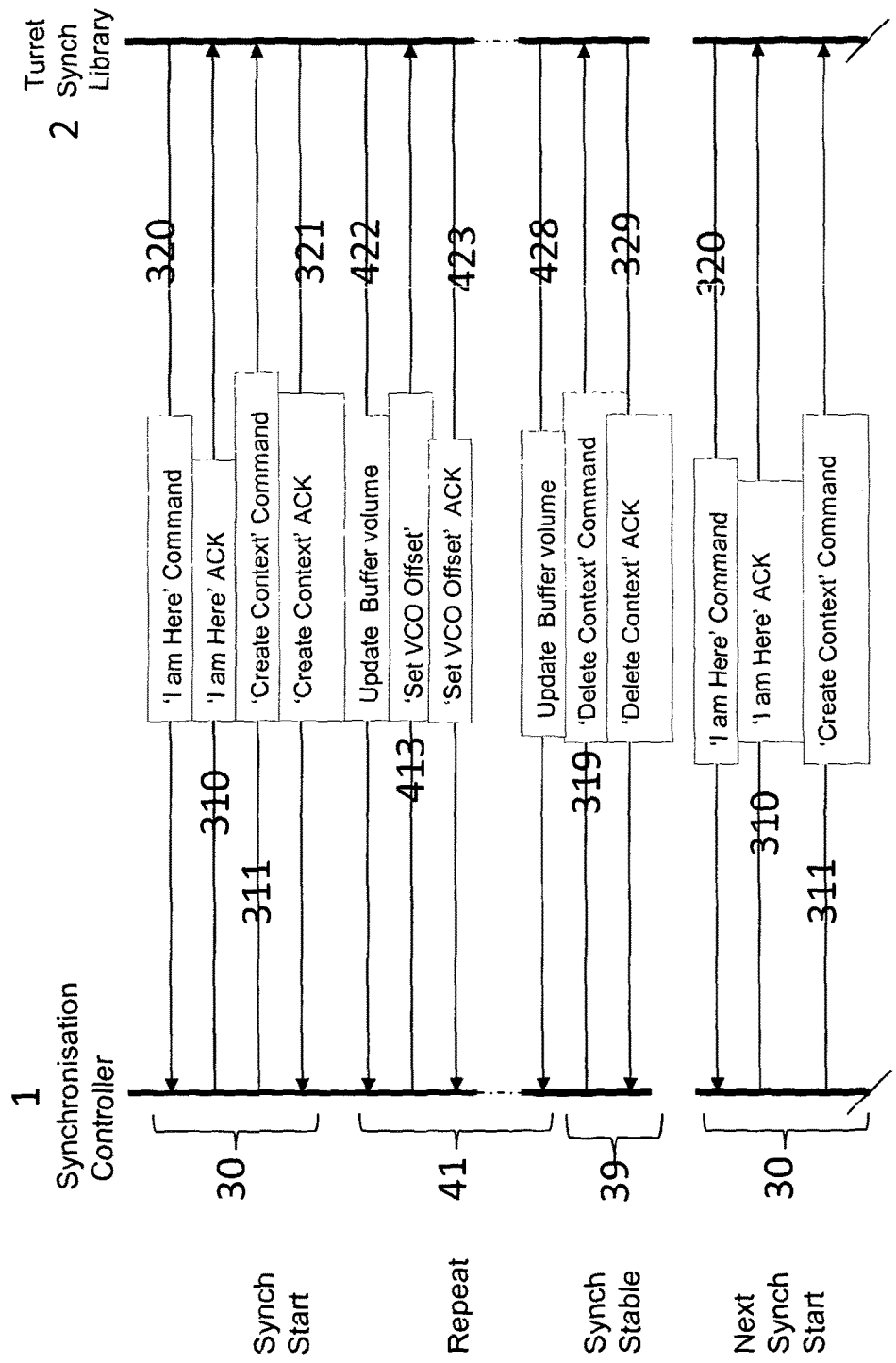
FIG. 5 is a sequence diagram illustrating the exchange of signals between the synchronisation server and the user terminal in the second embodiment

A second embodiment is depicted in FIGS. 4 and 5, in which features common with the embodiment of FIGS. 2 and 3 have the same reference numerals. In this embodiment, instead of transmission of a data sample through a transmitter 21 and associated convertor 210, the iterative process 41 requires that, periodically during the synchronisation process, the terminal 2 sends update messages 422 to the server 1 indicative of the volume of data in the playout buffer in the packet processor 23. (An output from the buffer 23 to the command interface 26 for this purpose is depicted in FIG. 4).

The server transmits an offset signal 413 to cause adjustments to be made to the terminal's VCO, so as to maintain the signal in the centre of the playout buffer on the terminal. The terminal acknowledges (423) the offset signal and stores the offset value 413 for use by its frequency control system 20. This ensures that the rate speech data is delivered at the output 29 remains in step with the input rate, avoiding the buffer 23 becoming overloaded or empty. Several terminals 2 may be controlled by the server 1 in the same way, allowing synchronisation through control of the buffer size.

Once stable synchronisation is achieved, the process terminates (step 39). This is triggered when the server 1 assesses the most recent buffer volume reading 428 that it has received as meeting specified stability criteria—for example that the volume has stabilised within allowable limits.

This arrangement avoids the need for the speech channel 21, 11 between the terminal 2 and server 1, but the data from the buffer may provide less precise fine control of the delay in the audio output.

Terminal synchronisation is initiated at such intervals as to compensate for crystal oscillator frequency drift and keep the audio play-out of the terminals within the required accuracy. The accuracy of calibration allows such intervals to be relatively infrequent, thereby minimising network bandwidth usage. The terminal 2 therefore sets a repeat interval, typically several hours or days, after which the process is repeated (300). Other triggers may also be set, such as when a significant change in context is detected, for example a new user, or a location update).

It will be understood that only terminals which are co-located need to be synchronised to avoid distracting acoustic effects, and so it would be possible to run a separate local synchronisation operation for each group of terminals sharing a location. However, it may be convenient to use a central synchronisation controller controlling terminals at several locations: this approach avoids the need to determine which terminals are co-located, which can itself involve significant overhead if the system includes mobile terminals, or terminals using temporary user identities. As each terminal only needs to perform the update process infrequently, a large number of terminals are capable of support by a single synchronisation controller. However, for very large installations it may be desirable to have several synchronisation controllers, in which case it will be necessary to determine the locations of the terminals to ensure that co-located terminals are all working to the same synchronisation controller.

The invention therefore synchronises the clock frequencies of all the terminals to a common reference, by remotely adjusting their Voltage controlled oscillator offset frequency in response to the synchronisation server. There is no necessity for the terminals to be aware of absolute time: it is sufficient to produce an accurate frequency to drive voice playout, in order to maintain each terminal's voice playout buffer at its initial depth/delay when playout commences.

The offset value can be retained by the terminals on disconnection from the server, to be applied again at terminal Power-up.

It is envisaged that once a reliable offset has been established the terminals will only require a check every few hours to ensure they remain synchronised. This approach is simpler, and requires less signalling overhead, than existing approaches which impose a centrally generated clocking pulse continuously transmitted to all terminals.

What is claimed is:

1. A method of controlling a telecommunications terminal in a packet switched system, wherein the method comprises:
    the terminal in the packet switched system transmits to a server a playback-rate-indication signal indicative of the rate at which the terminal plays an audio output,
    the server determines a playback offset value by comparison of the playback-rate-indication signal received from the terminal with a playback-rate set by the server,
    the server transmits the playback offset value to the terminal; and
    the terminal applies the playback offset value to its audio output so that the rate at which the output is played becomes synchronised to the rate set by the server.

2. A method according to claim 1, wherein the terminal has an internal clock having a predetermined clocking value, and the method further comprises the steps of:
    generating, at the terminal, a stream of packets of a duration determined according to the clocking value;
    transmitting the stream of packets over the packet switched system to a server having a master clock;
    at the server, determining the duration of the stream of packets according to the master clock;
    calculating the playback offset value, which is indicative of the difference between the duration of the stream determined by the terminal clock and the duration as determined by the master clock;
    transmitting the playback offset value to the terminal;
    adjusting the clocking value of the terminal by applying the playback offset value received from the server;
    operating packet handling functions of the terminal according to the adjusted clocking value.

3. A method according to claim 2, wherein the steps are repeated at intervals to maintain the clocking value within a predetermined limit from the master clock value.

4. A method according to claim 3, wherein the intervals at which the steps are repeated is selected according to the amount of drift in clocking value determined in previous iterations.

5. A method according to claim 1, wherein the terminal has an internal clock having a predetermined clocking value, the terminal has a data buffer, and the method further comprises the steps of:
    generating, at the terminal, a signal indicative of a depth of the buffer,
    transmitting the buffer depth signal to the server;
    at the server, calculating the playback offset value, which is indicative of the difference between the actual buffer depth and an optimum buffer depth determined by the server;
    transmitting the playback offset value to the terminal;
    adjusting the clocking value of the terminal by the playback offset value;
    operating packet handling functions of the terminal according to the adjusted clocking value.

6. A method according to claim 1, wherein the packet handling functions controlled by the internal clock include the generation of an audio signal from a packet stream.

7. A telecommunications terminal for connection to a packet switched system, the terminal comprising
    an internal clock having a predetermined clocking value;
    an audio output controlled by the clocking value;
    a signal generator for generating a playback-rate-indication signal indicative of the rate at which the terminal plays an audio output;
    a transmitter for transmitting the playback-rate-indication signal to a server;
    a receiver for receiving playback offset value from the server; and
    a clock adjustment processor for adjusting the clocking value of the internal clock according to the playback offset value.

8. A telecommunications terminal according to claim 7, further comprising
    a test packet generator for generating a predetermined set of data packets at a rate determined according to the clocking value;
    a transmitter for transmitting the predetermined set of data packets over the packet switched system to the server.

9. A telecommunications terminal according to claim 7, having a data buffer, and the signal generator being configured to generate a signal indicative of the buffer depth for transmission to the server.

10. A telecommunications terminal according to claim 7, wherein the signal generator is arranged to generate signals for transmission to the server at intervals such as to maintain the clocking value within a predetermined limit from the master clock value.

11. A telecommunications terminal according to claim 10, wherein the intervals at which the signals are transmitted is selected according to the rate of change in clocking values determined from previous offset values.

12. A telecommunications terminal according to claim 7, comprising an audio signal generator for generating an audio signal from incoming packet streams, the audio signal generator being controlled by the internal clock.

13. A server for connection to a packet switched telecommunications system for controlling one or more telecommunications terminals connected to the system, the server comprising:
- a master clock;
- a receiver for receiving a playback-rate-indication signal from each terminal indicative of the playback rate at which each respective terminal plays an audio output,
- a processor for calculating, for each terminal, a respective playback offset value derived from the playback-rate-indication signal received from the terminal, and
- a transmitter for transmitting the playback offset values to the respective terminals so that the playback offset values can be used by the terminals to control the audio output.

14. A server according to claim 13, wherein the receiver is arranged to receive a stream of data packets having a notional duration determined by the terminal, and comprising;
- a timer for determining the duration of the received stream of packets according to the master clock the processor being configured to calculate the offset by comparing the notional duration of the stream with the actual duration of the stream as determined by the master clock.

15. A server according to claim 13, wherein the receiver is arranged to receive a signal from a terminal indicative of buffer depth in the terminal, the processor being configured to determine the playback offset value, which is indicative of the difference between the actual buffer depth and an optimum buffer depth.

16. A server according to claim 13, further comprising a program store for storing program data for configuring a terminal to operate wherein the server is configured to identify one or more terminals to be synchronised, and to transmit the program data to the terminals so identified, together with address data specific to the server such that the terminals can transmit signals to the server indicative of their clocking rate.

* * * * *